US009031932B2

(12) United States Patent
Idicula et al.

(10) Patent No.: US 9,031,932 B2
(45) Date of Patent: May 12, 2015

(54) AUTOMATIC DENORMALIZATION FOR ANALYTIC QUERY PROCESSING IN LARGE-SCALE CLUSTERS

(75) Inventors: Sam Idicula, Santa Clara, CA (US); Sabina Petride, Hayward, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 350 days.

(21) Appl. No.: 13/605,903

(22) Filed: Sep. 6, 2012

(65) Prior Publication Data

US 2014/0067791 A1    Mar. 6, 2014

(51) Int. Cl.
*G06F 17/30* (2006.01)

(52) U.S. Cl.
CPC .... *G06F 17/30592* (2013.01); *G06F 17/30457* (2013.01); *G06F 17/30501* (2013.01)

(58) Field of Classification Search
None
See application file for complete search history.

(56) References Cited

U.S. PATENT DOCUMENTS

| | | | | |
|---|---|---|---|---|
| 6,931,418 | B1* | 8/2005 | Barnes | 707/776 |
| 7,054,315 | B2* | 5/2006 | Liao | 370/392 |
| 7,171,427 | B2* | 1/2007 | Witkowski et al. | 1/1 |
| 8,086,598 | B1* | 12/2011 | Lamb et al. | 707/714 |
| 8,510,291 | B2* | 8/2013 | Cole et al. | 707/714 |
| 2003/0088558 | A1* | 5/2003 | Zaharioudakis et al. | 707/3 |
| 2003/0208399 | A1* | 11/2003 | Basak et al. | 705/14 |
| 2004/0006561 | A1* | 1/2004 | Nica | 707/3 |
| 2006/0218123 | A1* | 9/2006 | Chowdhuri et al. | 707/2 |
| 2006/0218157 | A1* | 9/2006 | Sourov et al. | 707/100 |
| 2008/0033914 | A1* | 2/2008 | Cherniack et al. | 707/3 |
| 2008/0189239 | A1* | 8/2008 | Bawa et al. | 707/2 |
| 2008/0281801 | A1* | 11/2008 | Larson et al. | 707/4 |
| 2010/0114976 | A1* | 5/2010 | Castellanos et al. | 707/803 |
| 2011/0137890 | A1* | 6/2011 | Bestgen et al. | 707/719 |
| 2011/0173164 | A1* | 7/2011 | Bendel et al. | 707/693 |
| 2012/0072412 | A1* | 3/2012 | Bestgen et al. | 707/714 |
| 2012/0284280 | A1* | 11/2012 | Kumar | 707/743 |
| 2012/0310917 | A1* | 12/2012 | Sheinin et al. | 707/714 |
| 2013/0159285 | A1* | 6/2013 | Dees et al. | 707/718 |
| 2013/0246341 | A1* | 9/2013 | Tobin et al. | 707/603 |

OTHER PUBLICATIONS

João Pedro Costa, José Cecilio, Pedro Martins, and Pedro Furtado "Overcoming the scalability limitations of parallel star schema data warehouses", Sep. 4, 2012, Springer-Verlag Berlin, pp. 473-486.*
Costa et al. "A Predictable Storage Model for Scalable Parallel DW", Sep. 21-23, 2011, ACM.*

(Continued)

*Primary Examiner* — Polina Peach
(74) *Attorney, Agent, or Firm* — Hickman Palermo Becker Bingham LLP; Ellen Y. Wei

(57) ABSTRACT

A system and method for improving performance of join operations is disclosed. The method in one embodiment includes building a graph of vertices and edges, which represent the tables and join conditions for a particular database schema. The method then traverses the graph to find a set of candidate join operations. The method further includes selecting from the set of subset of join operations that makes the best use of a given amount of memory, which means finding a collection of denormalizations which when residing in memory provide the most benefit and the least cost for the given amount of memory. The method then deploys the denormalizations so that current queries in a query processing system can use them instead of actually performing the joins.

23 Claims, 12 Drawing Sheets

(56) References Cited

OTHER PUBLICATIONS

Seung Kyoon Shina, G. Lawrence Sanders "Denormalization strategies for data retrieval from data warehouses", 2004, Science Direct.*
YMA PINTO "A Framework for Systematic Database Denormalization", 2009, Global Journal of Computer Science and Technology.*
G.L. Sanders and S.K. Shin., "Denormalization Effects on Performance of RDBMS", In Proceedings of the HICSS Conference, Jan. 2001, 9 pages.
Z. Wei, J. Dejun, G. Pierre, C-H. Chi and M. Van Steen. "Service-Oriented Data Denormalization for Scalable Web Applications", In Proceeding of the International World-Wide Web Conference, Apr. 2008, 10 pages.
Sharad Mehrotra et al., "Materialized View Selection and Maintenance Using Multi-query Optimization" Proceedings of the 2001 ACM Sigmod International Conf. dated Jan. 1, 2001, pp. 307-318.
Lin Qiao et al., "Main-Memory Scan Sharing for Multi-Core CPUs", Proceedings of the VLDB Endowment, vol. No. 1, dated Aug. 1, 2008, pp. 610-621.
Gupta et al., "Selection of Views to Materialize in a Data Warehouse", IEEE Transactions on Knowledge and Data Engineering, IEEE Service Center, Los Alamitos, CA, dated Jan. 1, 2005, pp. 24-43.
Garima Thakur et al., "A Comprehensive Analysis of Materialized Views in Data Warehouse Environment", International Journal of Advanced Computer Science and Apps dated Jan. 1, 2011, 2 pages.

* cited by examiner

202

| Employee |||
| --- | --- | --- |
| Name | EmpID | DeptName |
| Harry | 3415 | Finance |
| Sally | 2234 | Sales |
| George | 3401 | Finance |
| Harriet | 2202 | Sales |

204

| Dept ||
| --- | --- |
| DeptName | Manager |
| Finance | George |
| Sales | Harriet |
| Production | Charles |

206

| Employee ⊗ Dept ||||
| --- | --- | --- | --- |
| Name | EmpID | DeptName | Manager |
| Harry | 3415 | Finance | George |
| Sally | 2234 | Sales | Harriet |
| George | 3401 | Finance | George |
| Harriet | 2202 | Sales | Harriet |

AUTOMATIC DENORMALIZATION FOR ANALYTIC QUERY PROCESSING IN LARGE-SCALE CLUSTERS

FIELD OF THE INVENTION

The present invention relates generally to database management systems and more particularly to denormalizations for processing in-memory queries.

BACKGROUND

Analytic query processing in data warehouses typically involves large data sets that are updated infrequently in batch-oriented manner. In many cases, it is desirable to execute queries on larger amounts of data (typically spanning a longer time period), but the performance of the query processing system limits the data set size.

Performance can be improved by processing the queries in memory and by increasing the number of servers operating on the queries. However, more servers increases power and power-related infrastructure costs for the servers, putting a bound on the number of servers and thus the size of the data sets.

Alternatively, performance can be improved at lower power by performing in-memory database queries in a cluster of low-power processing units. Each processing unit has low compute power, but a cluster with thousands of processing units has very high performance. While in-memory database query processing in the cluster increases performance, one kind of query operation still poses a challenge. Large table joins do not scale in performance with the size of the cluster. Therefore, it is desirable to seek further improvements in the performance of in-memory processing of large table joins.

BRIEF DESCRIPTION OF THE DRAWINGS

In the drawings:

FIG. 2 depicts a conventional join;

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Figure 1:
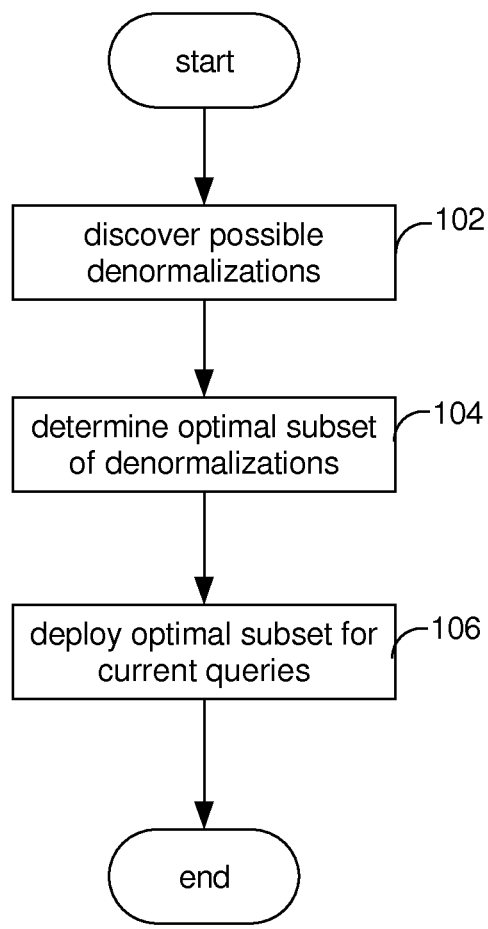
FIG. 1 depicts flow chart of overall operation according to one embodiment.

An embodiment performs an automatic denormalization of large relational joins. The denormalization is adapted to the query workload and the amount of memory in each processing unit of a cluster. In one embodiment, depicted in FIG. 1, automatic denormalization has three phases: (i) discovery 102, (ii) optimization 104, and (iii) deployment 106.

In the discovery phase, the embodiment constructs a representation of tables and join conditions for a given schema and then analyzes the representation to find a set of possible denormalizations.

In the optimization phase, the task is to select the denormalizations that make the best use of a given amount of memory. The optimization phase has two parts, (i) reducing the amount of memory needed for each individual denormalization, and (ii) determining an optimal collection of the possible denormalizations. Memory is reduced by compressing columns or rows of the tables involved. An optimal collection of possible denormalizations is discovered by calculating the cost and benefit for each possible denormalization. The cost is the amount of memory needed for a denormalization and is based on query workload statistics or on the sizes of the tables. The benefit is based on the number of joins that are eliminated by the denormalization. An optimal subset includes those denormalizations that provide the most benefit at the least cost within the available memory.

In the deployment phase, the embodiment integrates each denormalization in the optimal set into the real-time system so that an in-coming query can find and use the denormalization.

Detailed Discussion

There are many kinds of relational joins. One kind is a natural join, which is depicted in FIG. 2. In this join, the two tables, Employee 202 and Dept 204, are joined based on the column DeptName. A natural join is defined as the union of the tuples in the two tables subject to a condition, which is that the tuples are compatible. This means that the two tables have at least one attribute in common. In the example depicted in FIG. 2, The Employee table and the Dept table both have the DeptName in common. The natural join yields the join table 206, which has only the entries from the Dept table whose values in DeptName column match the values in DeptName column in the Employee table.

Another kind of join is a Cartesian join. If the two tables in a join have no attributes in common, then this join produces a table in which every tuple in the first table is combined with every tuple in the second table.

Discovery Phase

A database schema typically includes a set of tables, including their column definitions, and optionally a set of constraints or relationships among the tables. For example, a TPC-H workload has database schemas shown in FIG. 3 and FIG. 4. In the discovery phase, as depicted in FIG. 5, the system creates a directed graph in step 502 from a given schema and then traverses the graph in step 504 to locate a set of possible denormalizations.

Figure 3:
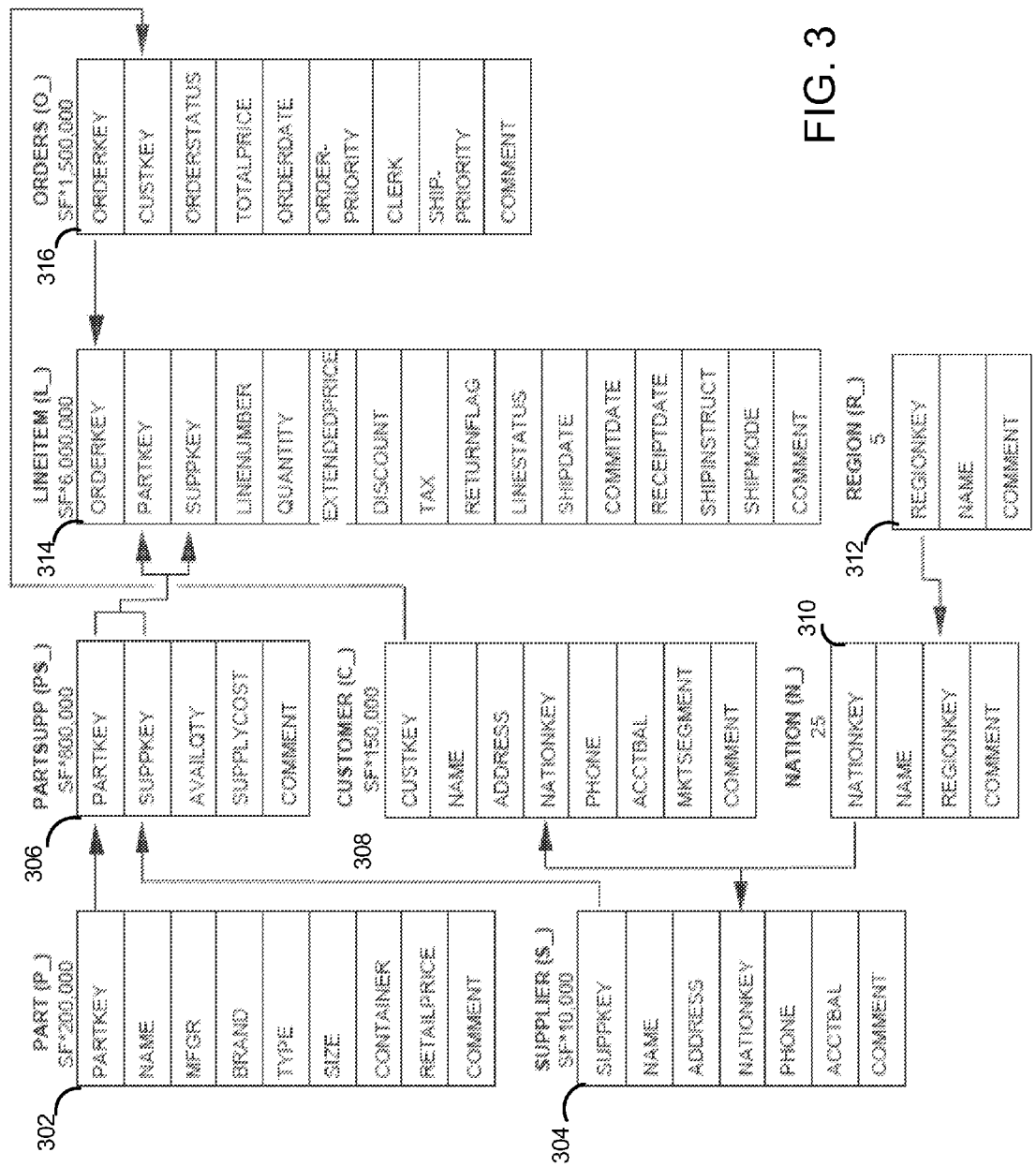
FIGS. 3 and 4 depict database schemas for the TPC-H workload.

The schema in FIG. 3 includes the following tables: Part 302, Supplier 304, Part Supp 306, Customer 308, Nation 310, Region 312, LineItem 314, and Orders 316. The schema in FIG. 3 also indicates the referential constraints between the tables. For example, the constraint below, constraint->lineitem.orderkey references orders.orderkey, is based on the orderkey in the LineItem table referencing the orderkey in the Orders table. Additionally, the partkey refers to the LineItem, Part, and Part Supp tables; the custkey refers to the Order and Customer Tables; the suppkey refers to the LineItem, Supplier and Part Supp tables; the nationkey refers to the Customer, Supplier, and Nation tables; and the regionkey refers to the Nation and Region tables.

Figure 4:
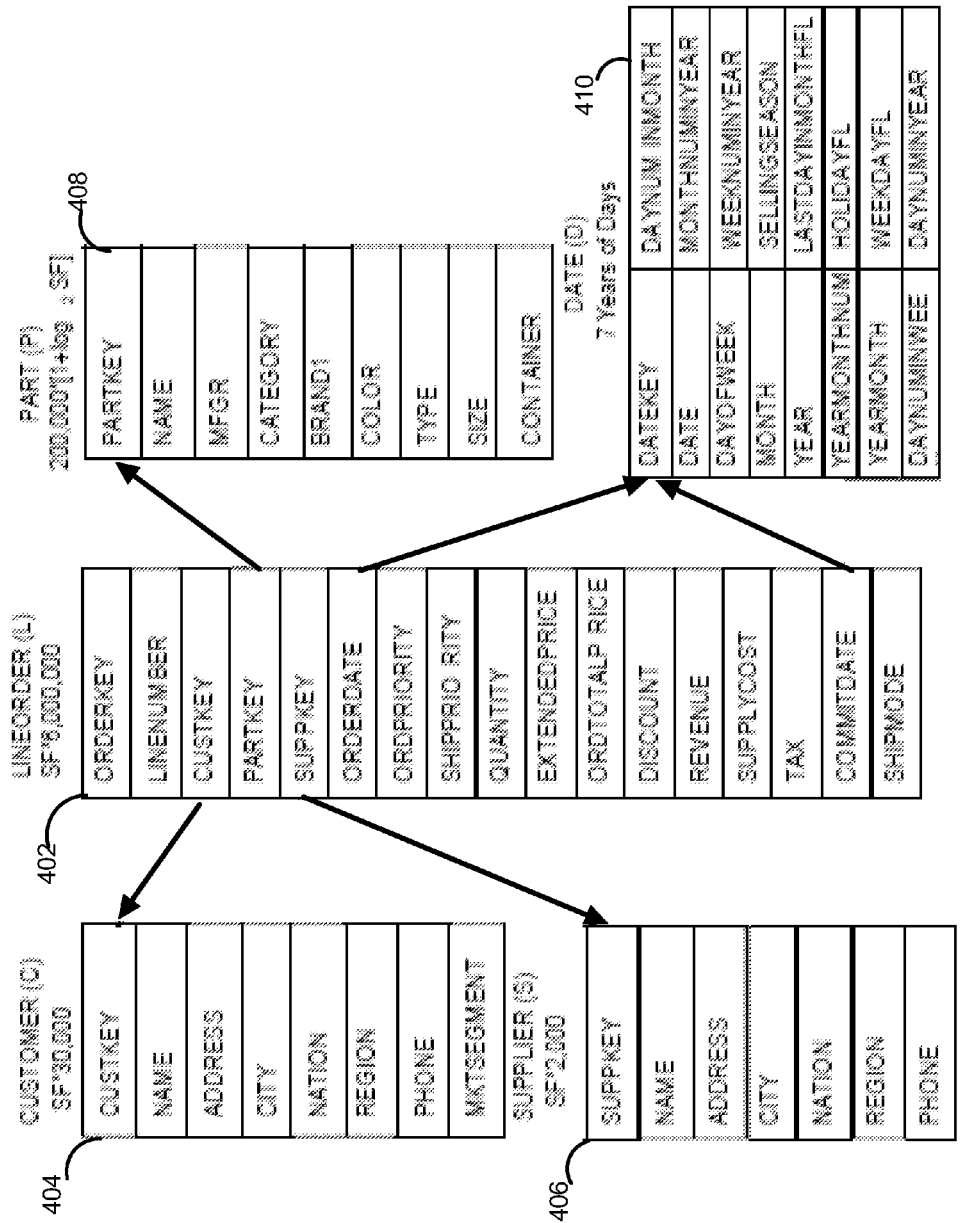
Figure 5:
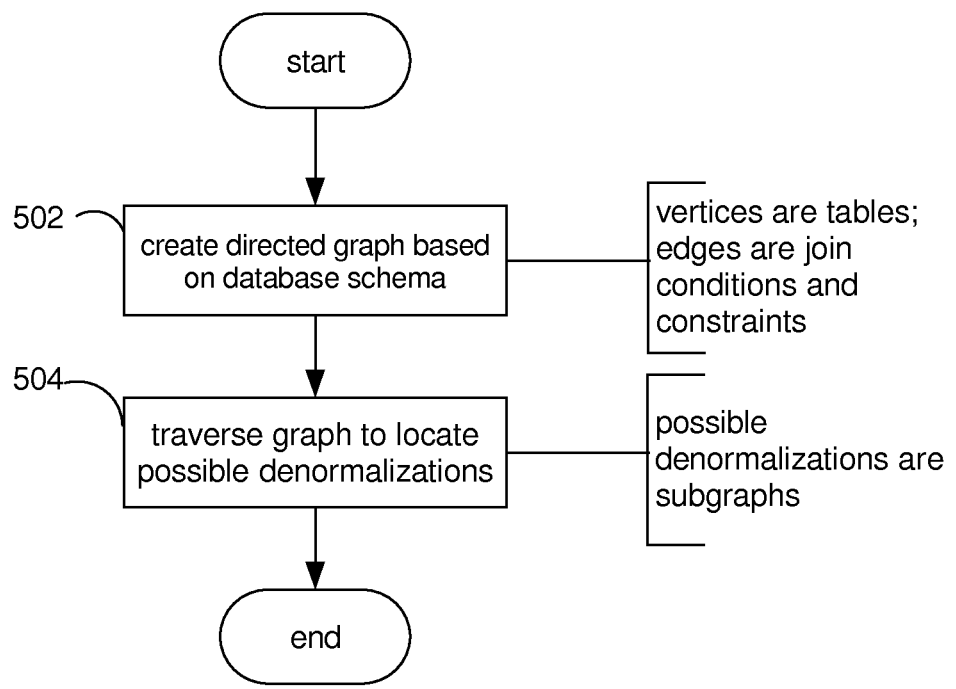
FIG. 5 depicts a flow chart for discovery phase according to one embodiment.

An alternative schema for the TPC-H workload is depicted in FIG. 4 and includes the following tables: LineOrder 402, Customer 404, Supplier 406, Part 408, and Date 410. The referential constraints are also indicated. The custkey refers to the Customer table; the suppkey refers to the Supplier table; the partkey refers to the Part table and the orderdate and commitdate refer to the Date table.

Figure 6:
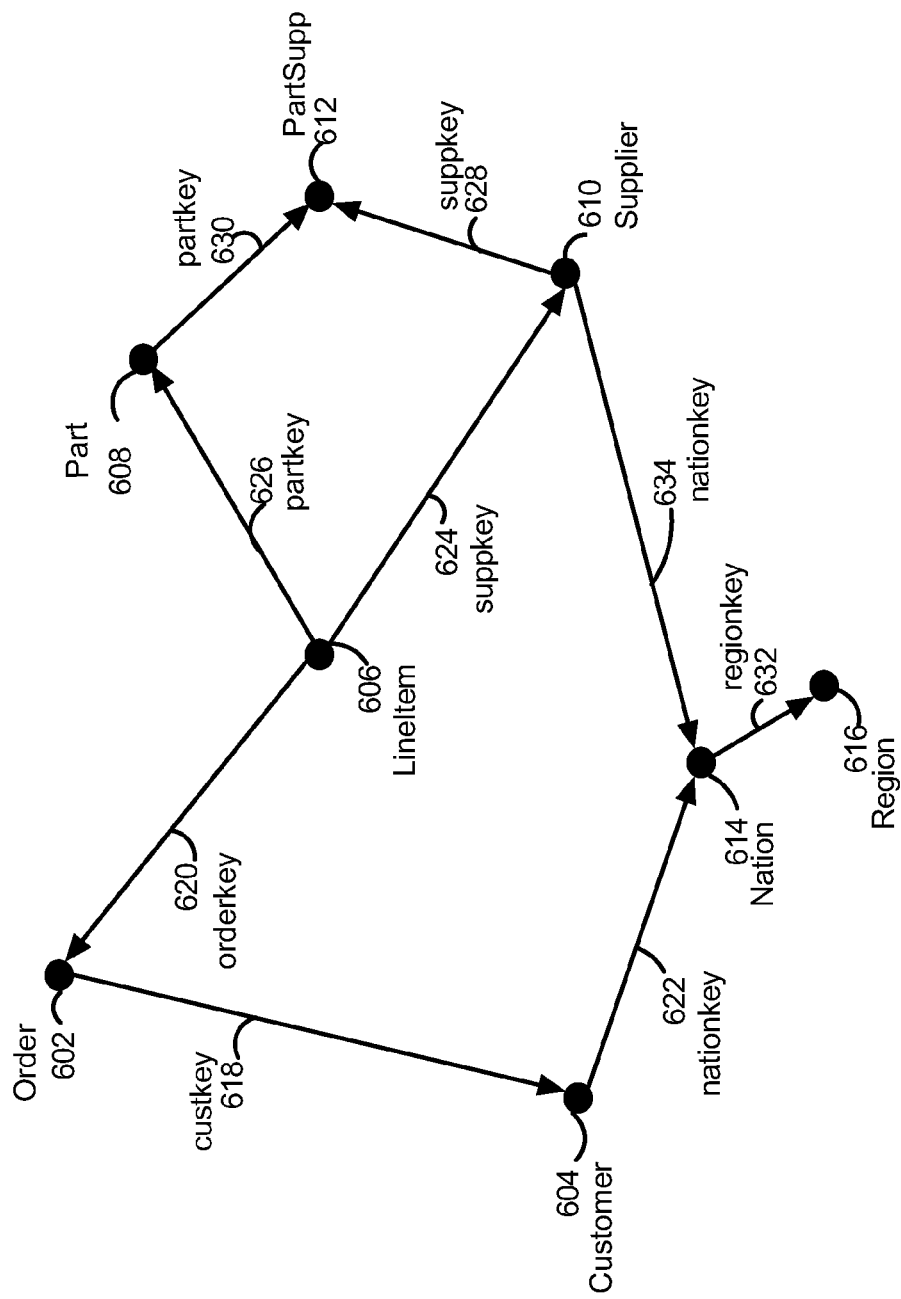
FIGS. 6 and 7 depict directed graphs for the database schemas depicted in FIGS. 3 and 4.

FIG. 6 depicts a directed graph created from the schema of FIG. 3. In FIG. 6, each vertex 602, 604, 606, 608, 610, 612, 614, 616 is a table in the schema of FIG. 3. The edges 618, 620, 622, 624, 626, 628, 630, 632, 634 between each pair of vertices represent a directed relationship between the pair of tables represented by the vertices and each edge is annotated with the join condition between the two tables.

Figure 7:
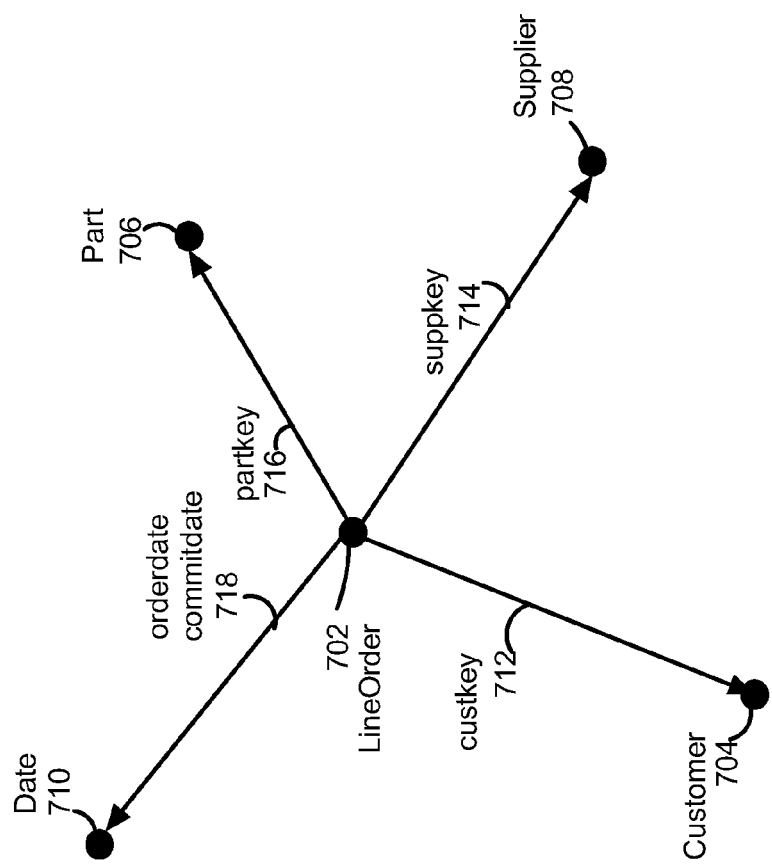

FIG. 7 depicts a directed graph created from the schema of FIG. 4. Again, the vertices 702, 704, 706, 708, 710 represent the tables in the schema and the edges 712, 714, 716, 718 represent the join conditions between the tables and are annotated with those conditions.

In directed graphs of FIGS. 6 and 7, the information for annotating the edges is derived from the corresponding schemas. In another embodiment, the query workload indirectly provides the information needed for annotating the edges. The annotations are inferred by analyzing queries in a recent workload or a training workload. In the embodiment, the system parses a given set of queries to find the join predicates, which are predicates that refer to columns of two different tables. The table aliases in each join predicate are mapped to the appropriate tables and an edge is added in the graph between the corresponding vertices and annotated with the join condition. The direction of the edge is inferred from the sizes of the two tables, where size refers to the number of rows in each table. The direction of each edge is from the larger table to the smaller table. Examining the query workload soon reaches a steady state where no edges are added to the graph, because join conditions between tables of a schema are generally the same across various queries.

Graph Structure for a Star or Snowflake Pattern

FIG. 7 depicts the directed graph for the schema of FIG. 4 and has a star pattern. In other embodiments, the workload is arranged in a snowflake pattern.

A star or snowflake arrangement has two kinds of tables, fact tables and dimension tables. The fact tables hold values pertaining to a specific event and have only outgoing edges. Dimension tables hold values that are described by the fact data and have only incoming edges. The LineOrder table in FIG. 7 is the center of the "star" and is a fact table. The Customer, Supplier, Part, and Date tables are arranged around the center of the star and are dimension tables.

In FIG. 6, the LineItem table can be considered a fact table and the Region and Part Supp tables could be considered dimension tables.

Traversing the Graph

After creating the graph for a given schema, the system traverses the graph to find potential denormalizations. It starts with vertices that have zero inbound edges, i.e., fact tables (such as the LineItem table in FIG. 6 or the LineOrder table in FIG. 7), and follows the outgoing edges to the dimension tables. Each fact table and one or more of its dimension tables (such as the Orders table FIG. 6 or the Customer table in FIG. 7) is a possible denormalization. To limit the number of possible denormalizations, the traversal can be constrained to a first level, that is, to first consider all of the dimension tables of a fact table before looking for additional denormalizations based on first level dimension tables considered as fact tables. Viewed in this manner, the graph traversal function is recursive. Controlling the depth of the recursion limits the number of possible denormalizations.

Subgraphs

Figure 8:
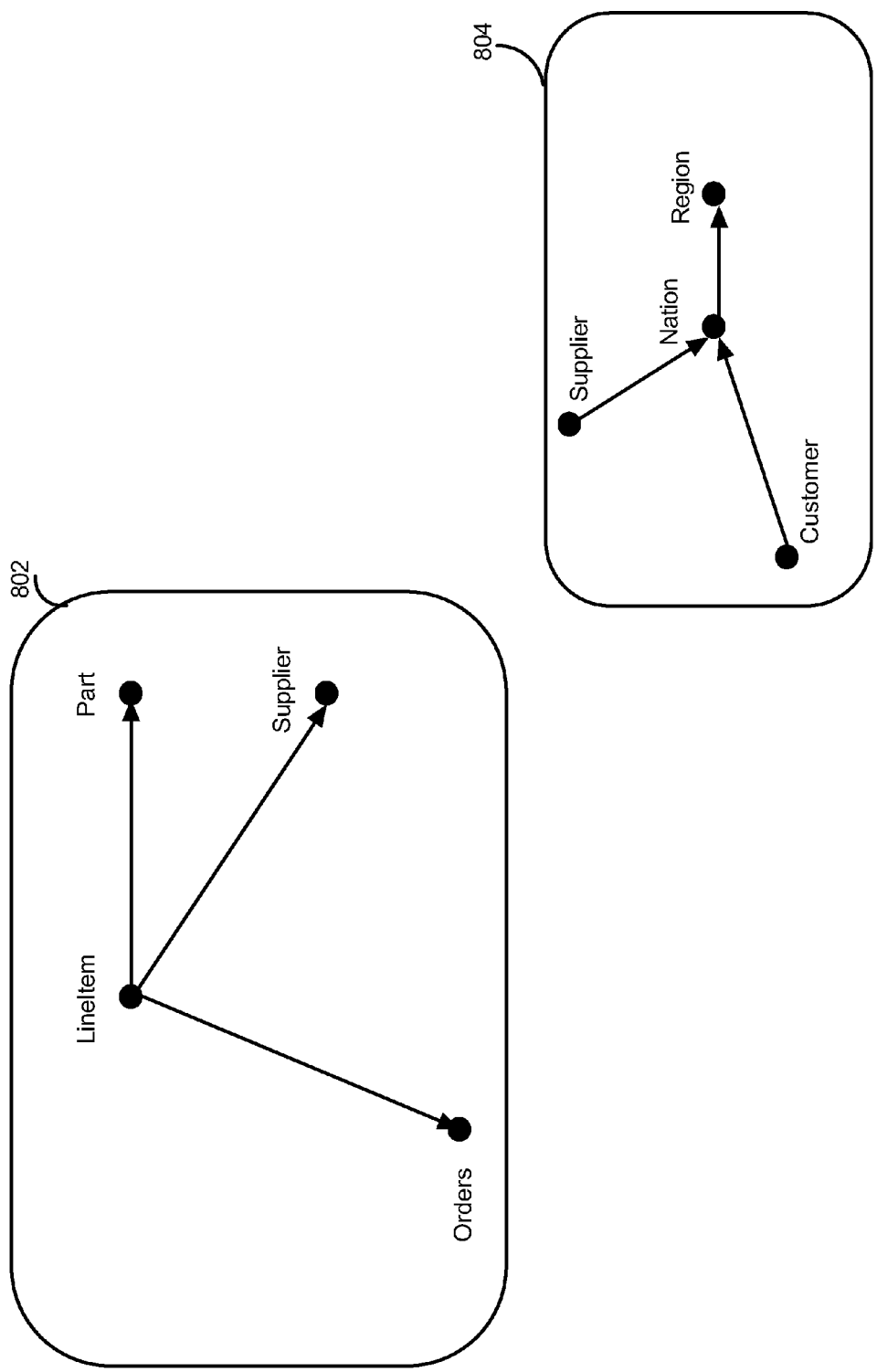
FIG. 8 depicts directed subgraphs for the database schema depicted in FIG. 3.

Each possible denormalization is represented by a subgraph of the original directed graph such as those 802, 804 as depicted in FIG. 8 for the schema of FIG. 3.

Forming SQL Query

Discovery also includes forming an SQL query for each possible denormalization. The SQL query is generated by adding tables corresponding to the vertices in the subgraph to the FROM clause of the query; adding all of the columns of each of these tables to the SELECT clause; and adding the join condition on each edge to the WHERE clause, combining them using an 'AND.'

Optimization

Figure 9:
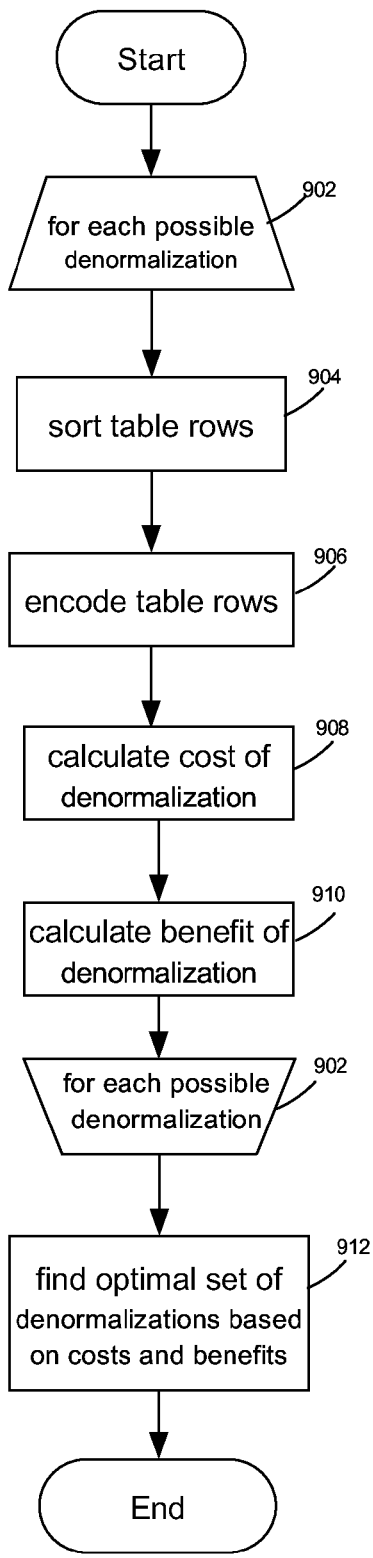
FIG. 9 depicts a flow chart for optimization phase according to one embodiment.

As mentioned above, the optimization phase, depicted in FIG. 9, attempts to find the subset of denormalizations that make the best use of a given amount of memory.

Compression

As mentioned above, columns and rows of tables in a denormalized relation are compressed to reduce the amount of memory required by the relation. The compression process has two steps, sorting and encoding. In step 902 of FIG. 9, rows of a table are sorted, in step 904, based on the primary keys of the dimension tables, starting with the table that is the farthest from the fact table. Sorting ensures that rows from the dimension tables(s) that are duplicated in the denormalized relation are contiguous. Sorting can be performed by adding an 'ORDER BY' clause to an SQL query.

In step 906, encoding is performed on columns in a relation when the relation is in column-major order. Encoding can be performed to a row-major or hybrid representation, where the rows of the dimension table are stored in row-major form. In the row-major case, the run-length needs to be specified only once for each row of the dimension table.

In one-embodiment, run-length encoding is used. This kind of encoding uses one or at most a few bytes to specify the number of repetitions of a value, followed by the value itself; this significantly reduces the amount of memory for the sorted tables in the denormalized relation and is simple enough that query operations can still be performed efficiently on the encoded representation of the tables.

Column data can encoded with other types of codes. For example, dictionary-based encoding is based on assigning a numeric code to each unique value in a column; the column can then be encoded by substituting the numeric code wherever the value appears. Run-length encoding can also be used in conjunction with dictionary coding.

Optimal Set

As mentioned above, determining the optimal subset of denormalized relations involves performing a cost calculation, in step 908, and a benefit calculation in step 910, where the cost is the amount of memory that a relation uses and the benefit is the "cost" of joins eliminated by using the denormalization.

In one embodiment, the cost $M_i \epsilon M$ of each denormalization is computed by collecting size estimates from queries that have been run in the system. This technique is the most accurate if the query workload is available. It looks at the queries, and keeps track of the actual size of each join.

In another embodiment, the cost is computed by finding the total of table sizes in the relation and the overhead for specifying the encoding of the tables. For each fact table, the system computes the total starting with the size of largest fact table and adds the sizes of its dimension tables in descending order of size and the overhead of encoding each table. If the fact table total has not exceeded the available memory, a total starting at any dimension table that has outgoing edges and it encoding overhead is also computed. If available memory is exceeded for either the total starting at a fact table or a total starting at a dimension table, then the process is stopped. The total amount of memory for the cost is in units of memory chunks, which are convenient subunits of the total amount of available memory.

In an embodiment where run-length encoding is used, the overhead for the table is the average run length. The average run length is the ratio of the size of the fact table to that of the dimension table, rounded off to the nearest power of 2.

The benefit $B_i \epsilon B$ of each denormalized relation is determined by finding the total cost of a join that would otherwise have been performed, i.e., the cost of the join without the denormalization. The total cost is the cost of the join across all queries in a query workload and is in units of memory chunks.

Having computed the cost and benefit for each potential denormalization, the optimum subset of denormalizations is discovered in step 912. Let M be the set of costs, B be the set of benefits, L be the size of memory in chunks, and N be the number of possible denormalizations. Then the optimal set of denormalizations is $S(L,N)$ and total benefit is $T(L,N)$, where $(S(L,N),T(L,N))=f(M,B)$. The function $f$ determines the benefit and cost for each possible denormalization (1 .. N) and for each possible memory size (1 .. L), so that end of the computation yields the optimal set S and total benefit T.

Figure 10:
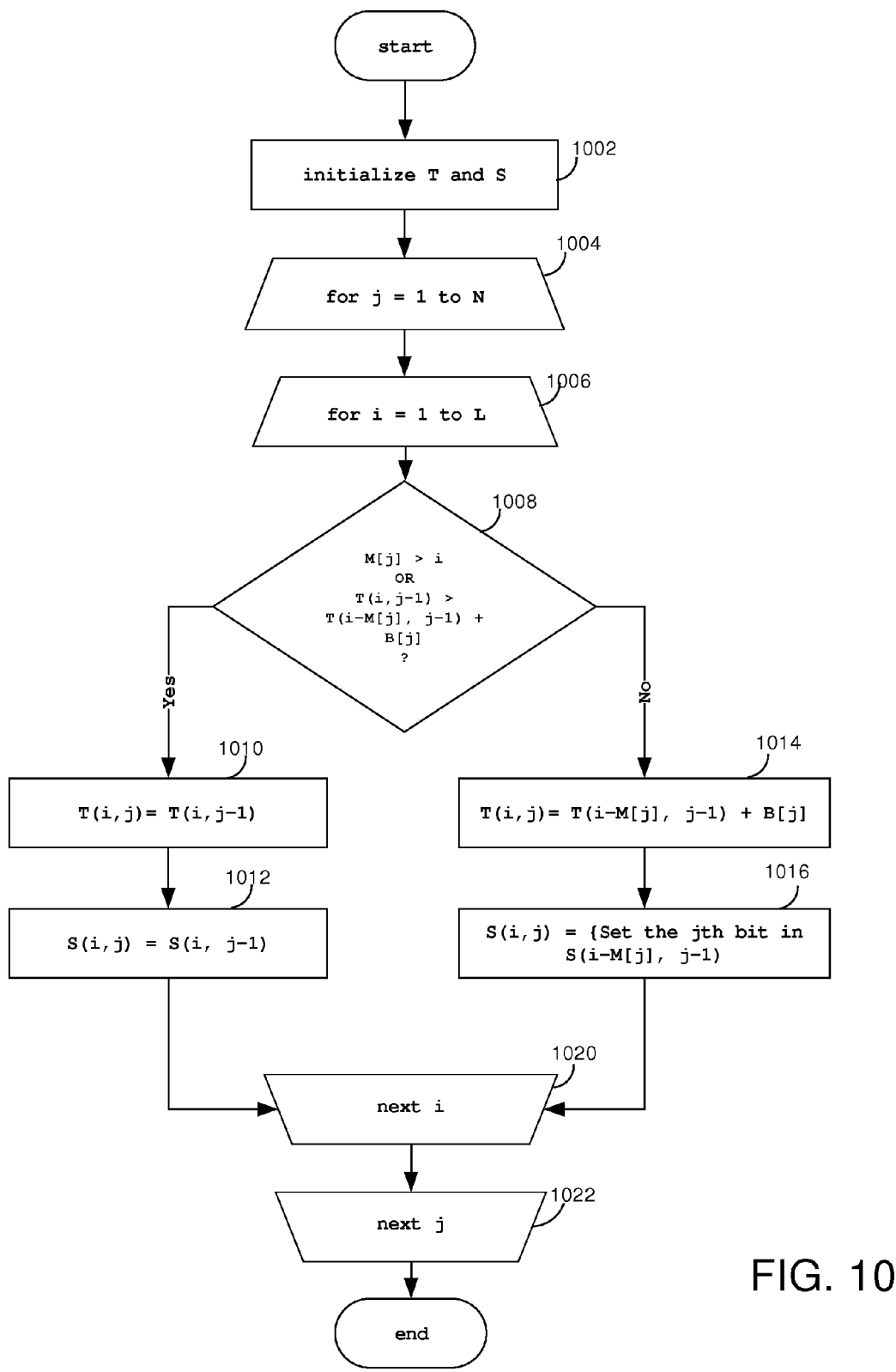
FIG. 10 depicts a flow chart for the optimization function according to one embodiment.

In one embodiment, the function $f(M,B)$ is the one depicted in FIG. 10. In that function, the sets $S(L,N)$, $T(L,N)$ are implemented, respectively, as two dimensional arrays $S(i,j)$, $T(i,j)$ where i=[0 .. L] and j=[0 .. N]. In step 1002, the T and S arrays are initialized by setting $\forall j.T(0,j)=0$ and $\forall i.T(i,0)=0$ and by clearing bits $\forall j.S(0,j)$ and $\forall i.S(i,0)$. Two loops, one with j =1 ... N and i=1 .. L are initialized in steps 1004, 1006. The outer loop, j, steps through the number of possible denormalizations and the inner loop i, steps though the sizes of memory up to the maximum size L. Thus, the outer loop selects a denormalization and the inner loop examines the cost and benefit of the selected denormalization for each memory size. In step 1008, the function performs a test on M[j] and on T(i,j−1). If M[j]>i then the number of memory chunks for the jth denormalization is greater than the current size of the memory. If T(i, j−1)>T(i−M[j], j−1)+B[j] then the benefit of the previous denormalization is greater than the current one. In either case, the function then copies the previous benefit to the current benefit in step 1010 and the previous set of denormalizations providing the previous benefit to the current set in step 1012. Otherwise, in steps 1014 and 1015, the function updates the current benefit amount and the current set of denormalizations giving that benefit. When the function completes, the array entry T(L,N) has the maximum benefit for the given memory size L and the array entry S has the set of denormalizations providing that benefit.

Deployment

If a join can be performed by a denormalized relation, the join can be performed as a scan on the denormalized relation. The cardinality of a denormalized relation is the same as that of the fact table, assuming that strict referential constraints are enforced. Thus, there is no need to store the fact table separately in memory. Additionally, any join involving the fact table and any of the dimension tables in the denormalized relation can be eliminated, as long as the join predicates match those in the denormalized relation.

To verify a referential constraint between two tables, one smaller and the other larger, when the edges in the graph are inferred from the queries, a subset condition between the two tables is checked. First, the system ensures that the column of the smaller table is unique. Next, the system checks that the list of distinct values in larger table is a subset of the list of distinct values in smaller table, where number of distinct values in the column is equal to the total number of rows where the column's value is non-null.

Figure 11:
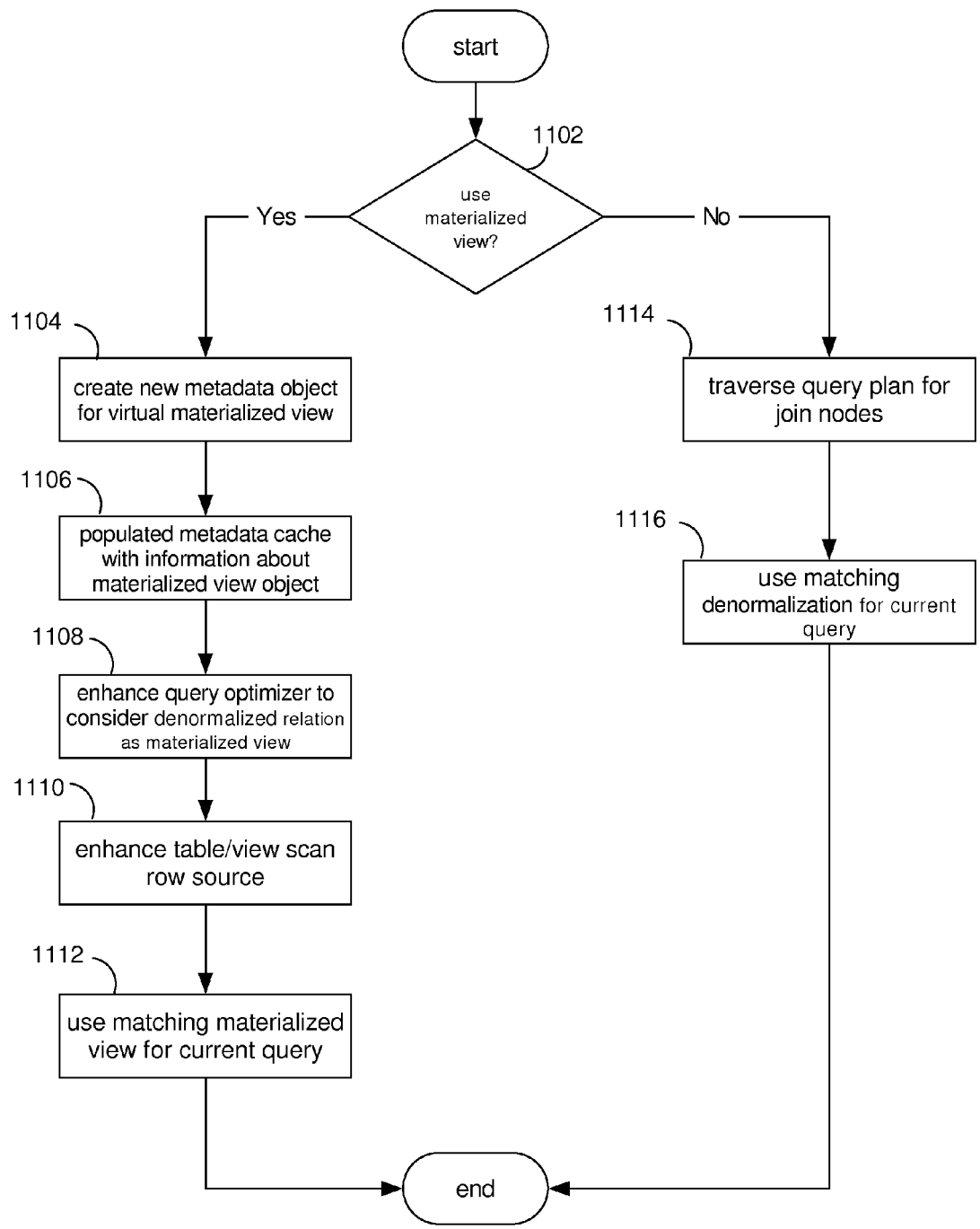
FIG. 11 depicts a flow chart for deployment according to one embodiment.

The query processing system matches the denormalized relations in the optimal set with incoming queries, as depicted in FIG. 11. In one embodiment, the system matches the in-memory denormalized relations exposed as 'virtual materialized views'. In another embodiment, the system matches in-memory denormalized relations during runtime.

To expose the denormalized relation as a materialized view, a new metadata object called a 'virtual materialized view' is added to the database system in step 1104. A metadata cache is populated, in step 1106, with information about the virtual materialized view objects, one for each denormalized relation, and the query optimizer is enhanced, in step 1108, to consider the denormalized relation as just a regular materialized view, except that the I/O cost is set to zero. Additionally, the table/view scan row source is enhanced, in step 1110, to handle this new type of view. Instead of the row source getting a list of blocks to read, the row source gets a list of memory chunks containing the denormalized relation. In step 1112, a matching materialized view is used for a current query. While creating virtual materialized views has the advantage of using an existing mechanism in the database system, it has a drawback in that the denormalized relation cannot be removed from memory because compiled queries may depend on it.

Instead of using a materialized view, the query processing system can make denormalizations available during runtime, as depicted in FIG. 11. The query processing system evaluates the query plan for an incoming query with regard to any join nodes, in step 1112. The system further traverses any sub-trees under the query plan and identifies any further joins that are immediately adjacent to the join node, i.e., not below a blocking row source, such as sorting or a grouping row source. If there is a candidate join node (row source), then if any fact table is involved, it is checked against the available, in-memory denormalized relations. The dimension tables and join conditions are also checked. If a match is found, the join is implemented as a scan (i.e., filter and projection) on the denormalized in-memory relation in step 1114. This way of accessing denormalized relations does not create any dependency between the compiled queries and the denormalized relations.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 12:
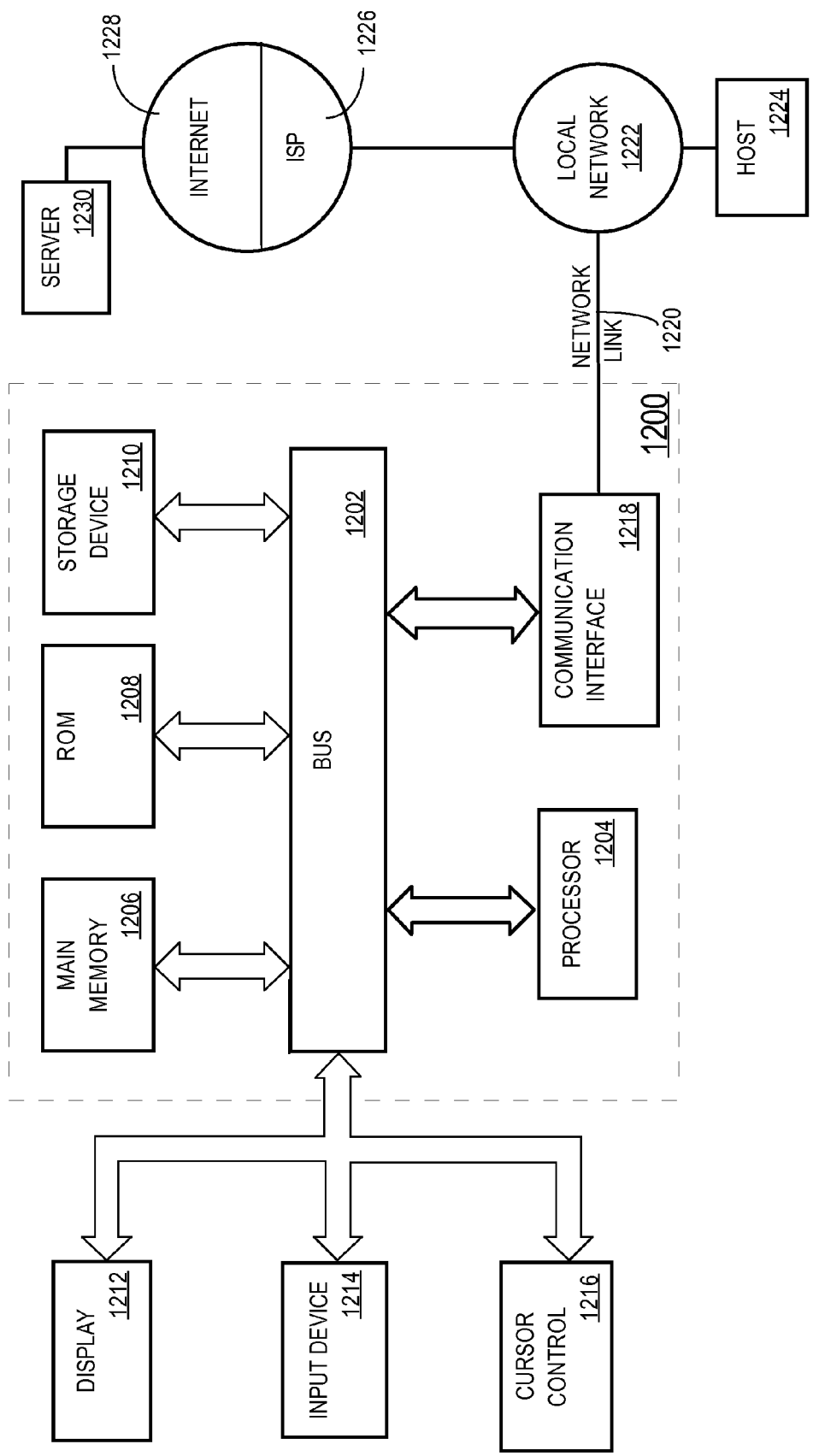
FIG. 12 depicts a system setting in which an embodiment operates.

For example, FIG. 12 is a block diagram that illustrates a computer system 1200 upon which an embodiment of the invention may be implemented. Computer system 1200 includes a bus 1202 or other communication mechanism for communicating information, and a hardware processor 1204 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    building a directed graph based on a corresponding schema of a database, the directed graph comprising vertices and edges, wherein the vertices represent tables in the corresponding schema and the edges represent relationships between the tables that correspond to join conditions;
    traversing the directed graph to determine a plurality of potential denormalizations;
    determining a plurality of costs and a plurality of benefits for the plurality of potential denormalizations, wherein each cost of the plurality of costs is based on a size of a denormalized relation corresponding to one of the plurality of potential denormalizations, wherein each benefit of the plurality of benefits is based on the cost of a join that is avoided when the denormalized relation is available; and
    determining, from the plurality of potential denormalizations, a plurality of selected denormalized relations based on an amount of available memory, the plurality of costs, and the plurality of benefits.

2. The method recited in claim 1, wherein the size of the denormalized relation is based on compression of the denormalized relation.

3. The method recited in claim 1, wherein determining the plurality of selected denormalized relations comprises:
    adding, to a current plurality of selected denormalized relations, a particular denormalized relation corresponding to a particular potential denormalization when the particular potential denormalization provides a benefit over the current plurality of selected denormalized relations and when a cost of the current plurality of selected denormalized relations is less than or equal to the amount of available memory.

4. The method recited in claim 1, wherein the plurality of potential denormalizations are represented by subgraphs of the directed graph.

5. The method recited in claim 1,
    wherein the vertices comprise at least one fact table vertex representing a fact table and at least one dimension table vertex representing a dimension table; and
    wherein the edges comprise at least edge from a fact table vertex to a dimension table vertex.

6. The method recited in claim 1, further comprising forming an SQL query for each potential denormalization in the plurality of potential denormalizations.

7. The method recited in claim 1, further comprising making the plurality of selected denormalized relations available for queries.

8. The method recited in claim 7, wherein making the plurality of selected denormalized relations available for queries includes exposing members of the plurality of selected denormalized relations as in-memory virtual materialized views.

9. The method recited in claim 7, wherein making the plurality of selected denormalized relations available for queries includes implementing scans for one or more of the plurality of selected denormalized relations.

10. A non-transitory computer-readable storage medium storing one or more instructions which, when executed by one or more processors, cause the one or more processors to perform the steps of:
    building a directed graph based on a corresponding schema of a database, the directed graph comprising vertices and edges, wherein the vertices represent tables in the corresponding schema and the edges represent relationships between the tables that correspond to join conditions;
    traversing the directed graph to determine a plurality of potential denormalizations;
    determining, from the plurality of potential denormalizations, a plurality of costs and a plurality of benefits for the plurality of potential denormalizations, wherein each cost of the plurality of costs is based on a size of a denormalized relation corresponding to one of the plurality of potential denormalizations, wherein each benefit of the plurality of benefits is based on the cost of a join that is avoided when the denormalized relation is available; and
    determining a plurality of selected denormalized relations based on an amount of available memory, the plurality of costs, and the plurality of benefits.

11. The non-transitory computer-readable storage medium of claim 10, wherein the size of the denormalized relation is based on compression of the denormalized relation.

12. The non-transitory computer-readable storage medium of claim 10, wherein determining the plurality of selected denormalized relations comprises:
    adding, to a current plurality of selected denormalized relations, a particular denormalized relation corresponding to a particular potential denormalization when the particular potential denormalization provides a benefit over the current plurality of selected denormalized relations and when a cost of the current plurality of selected denormalized relations is less than or equal to the available memory.

13. The non-transitory computer-readable storage medium of claim 10,
    wherein the plurality of potential denormalizations are represented by subgraphs of the directed graph.

14. The non-transitory computer-readable storage medium of claim 10,
    wherein the vertices comprise at least one fact table vertex representing a fact table and at least one dimension table vertex representing a dimension table; and
    wherein the edges comprise at least edge from a fact table vertex to a dimension table vertex.

15. The non-transitory computer-readable storage medium of claim 10, further comprising instructions that cause the one or more processors to perform the step of forming an SQL query for each potential denormalization in the plurality of potential denormalizations.

16. The non-transitory computer-readable storage medium of claim 10, further comprising instructions that cause the one or more processors to perform the step of making the plurality of selected denormalized relations available for queries.

17. The non-transitory computer-readable storage medium of claim 16, wherein making the plurality of selected denormalized relations available for queries includes exposing members of the plurality of selected denormalized relations as in-memory virtual materialized views.

18. The non-transitory computer-readable storage medium of claim 16, wherein making the plurality of selected denormalized relations available for queries includes implementing scans for one or more of the plurality of selected denormalized relations.

19. An apparatus comprising:
  one or more processors;
  a storage device coupled to each processor and containing instructions causing the one or more processors to perform:
    building a directed graph based on a corresponding schema of a database, the directed graph comprising vertices and edges, wherein the vertices represent tables in the corresponding schema and the edges represent relationships between tables that correspond to join conditions;
    traversing the directed graph to determine a plurality of potential denormalizations;
    determining a plurality of costs and a plurality of benefits for the plurality of potential denormalizations, wherein each cost of the plurality of costs is based on a size of a denormalized relation corresponding to one of the plurality of potential denormalizations, wherein each benefit of the plurality of benefits is based on the cost of a join that is avoided when the denormalized relation is available;
    determining, from the plurality of potential denormalizations, a plurality of selected denormalized relations based on an amount of available memory, the plurality of costs, and the plurality of benefits.

20. A method for improving performance recited in claim 1, wherein the edges represent at least one relationship determined based on analyzing queries in a recent workload or a training workload.

21. A method for improving performance recited in claim 1, wherein the edges represent at least one constraint indicated in the corresponding schema.

22. The non-transitory computer-readable storage medium of claim 10, wherein the edges represent at least one relationship determined based on analyzing queries in a recent workload or a training workload.

23. The non-transitory computer-readable storage medium of claim 10, wherein the edges represent at least one constraint indicated in the corresponding schema.

* * * * *

UNITED STATES PATENT AND TRADEMARK OFFICE
CERTIFICATE OF CORRECTION

PATENT NO. : 9,031,932 B2
APPLICATION NO. : 13/605903
DATED : May 12, 2015
INVENTOR(S) : Idicula et al.

It is certified that error appears in the above-identified patent and that said Letters Patent is hereby corrected as shown below:

IN THE SPECIFICATION

In column 2, line 61, delete "Part Supp" and insert -- PartSupp --, therefor.

In column 3, line 1, delete "Part Supp" and insert -- PartSupp --, therefor.

In column 3, line 3, delete "Part Supp" and insert -- PartSupp --, therefor.

In column 3, line 56, delete "Part Supp" and insert -- PartSupp --, therefor.

Signed and Sealed this
Ninth Day of February, 2016

Michelle K. Lee
*Director of the United States Patent and Trademark Office*